(12) United States Patent
Berry, Jr. et al.

(10) Patent No.: US 9,297,195 B2
(45) Date of Patent: Mar. 29, 2016

(54) HINGE DAMPER ASSEMBLY

(75) Inventors: Toby Berry, Jr., Steger, IL (US); David A. Doornbos, Manteno, IL (US); Daniel P. Calby, Mokena, IL (US)

(73) Assignee: Illinois Tool Works Inc., Glenview, IL (US)

( * ) Notice: Subject to any disclaimer, the term of this patent is extended or adjusted under 35 U.S.C. 154(b) by 507 days.

(21) Appl. No.: 13/322,976

(22) PCT Filed: May 13, 2010

(86) PCT No.: PCT/US2010/034630
§ 371 (c)(1),
(2), (4) Date: Nov. 29, 2011

(87) PCT Pub. No.: WO2010/141192
PCT Pub. Date: Dec. 9, 2010

(65) Prior Publication Data
US 2012/0073919 A1    Mar. 29, 2012

Related U.S. Application Data (60) Provisional application No. 61/183,608, filed on Jun. 3, 2009.

(51) Int. Cl.
*F16F 9/12* (2006.01)
*E05F 5/00* (2006.01)
*E05F 3/14* (2006.01)

(52) U.S. Cl.
CPC ... *E05F 5/00* (2013.01); *F16F 9/12* (2013.01); *E05F 3/14* (2013.01); *E05Y 2201/21* (2013.01); *E05Y 2201/254* (2013.01); *E05Y 2201/266* (2013.01); *E05Y 2900/538* (2013.01)

(58) Field of Classification Search
CPC ............... E05Y 2201/254; E05Y 2900/538; F16F 9/12
USPC ............................. 188/290, 293, 306; 16/54
See application file for complete search history.

(56) References Cited

U.S. PATENT DOCUMENTS

| | | | |
|---|---|---|---|
| 4,270,063 A * | 5/1981 | Dochterman | 310/66 |
| 4,796,733 A | 1/1989 | Nakayama | |
| 5,269,397 A * | 12/1993 | Kawamoto et al. | 188/290 |

(Continued)

FOREIGN PATENT DOCUMENTS

| | | |
|---|---|---|
| DE | 10341969 A1 | 4/2005 |
| EP | 1348827 A1 | 10/2003 |
| WO | 03/056121 | 7/2003 |

OTHER PUBLICATIONS

International Search Report of PCT/US2010/034630 dated Aug. 26, 2010.

(Continued)

*Primary Examiner* — Bradley King
(74) *Attorney, Agent, or Firm* — Paul F. Donovan (57) ABSTRACT

A damper assembly incorporating a bushing adapted to rotate within a wall structure and engage a post on a bin or other element to be controlled. The bushing defines a hub of an integral, coaxial rotor which rides within a fluid containing housing. The bushing and rotor rotate concurrently about a common axis during rotation of the bin or other device being controlled. The drag on the rotor thereby slows the rotation of the engaged post and the associated bin or other structure being controlled.

10 Claims, 7 Drawing Sheets

(56) References Cited

U.S. PATENT DOCUMENTS

| | | | |
|---|---|---|---|
| 5,301,775 A * | 4/1994 | Nedbal et al. | 188/290 |
| 5,522,485 A * | 6/1996 | Takahashi et al. | 188/306 |
| 5,816,372 A * | 10/1998 | Carlson et al. | 188/267.2 |
| 5,887,930 A * | 3/1999 | Klein | 296/37.12 |
| 6,041,899 A * | 3/2000 | Takamatsu | 188/290 |
| 7,240,398 B2 * | 7/2007 | Watanabe et al. | 16/51 |
| 7,296,664 B2 | 11/2007 | Ohta et al. | |
| 7,524,132 B2 * | 4/2009 | Horen et al. | 403/354 |
| 8,020,918 B2 * | 9/2011 | Patzer et al. | 296/146.11 |
| 2001/0017247 A1 * | 8/2001 | Machida | 188/290 |
| 2002/0158383 A1 * | 10/2002 | Nakabayashi | 267/134 |
| 2005/0006189 A1 * | 1/2005 | Kanno et al. | 188/290 |
| 2009/0096246 A1 * | 4/2009 | Patzer et al. | 296/146.11 |

OTHER PUBLICATIONS

International Search Report for PCT/US2013/047138 dated Aug. 22, 2013.

* cited by examiner

HINGE DAMPER ASSEMBLY

CROSS-REFERENCE TO RELATED APPLICATION

This application is national stage of PCT/US2010/034630 filed May 13, 2010, and claims the benefit of U.S. Provisional Patent Application Ser. No. 61/183,608, filed on Jun. 3, 2009.

TECHNICAL FIELD

The present invention relates generally to movement damper devices and, more particularly, to small dampers adapted to provide controlled rotation of structures such as bins, glove boxes, and the like, as may be found in automotive and other applications.

BACKGROUND OF THE INVENTION

Small dampers have many applications and uses for controlling the movement of various structures. By way of example only, dampers are found in various automotive applications including glove box doors, sunglass bins, cup holders, assist handles, and the like. Dampers are used in conjunction with such structures to control the natural gravitational movement of rotatably displaceable components and to provide a desired controlled movement of rotating components. Of course, uses for dampers in assemblies other than automobiles are also known. By way of example only, and not limitation, such alternative environments of use include furniture, appliances, electronic equipment and other assemblies with hinging moveable components.

One known damper design that has been used in the past incorporates a two-part construction. The first part is a bushing with an integrated sector gear in collar-like relation to the bushing. The bushing extends through a support wall and extends in mating relation about a hinge post of a bin or other pivoting article that is to be controlled. The hinge post may be held in place by use of an axial screw extending into the end of the hinge post. As the bin rotates, the bushing and integral sector gear also rotate due to the fixed connection to the hinge post. The second part of the prior two-part construction is a gear operatively connected to a fluid containing damper. This is referred to as a "gear/damper assembly". During operation, the sector gear which is integral with the bushing meshes with the gear on the gear/damper assembly. In this configuration, as the sector gear attempts to rotate with the hinge post, the gear/damper assembly provides a drag on such rotation thereby slowing the rotational movement of the bin or other unit being controlled.

While the prior two-part devices are believed to be highly functional, the use of two components with intermeshing gears may give rise to an undesirable level of complexity in manufacturing and installation. Specifically, one problem with such prior systems is that unless the mating gears are manufactured and installed within a tight range of tolerances the gears of the two components may not mesh properly. In this regard, if the gears are too far apart an undue level of stress may be placed on the gear teeth thereby causing breakage and/or the gear teeth may slip out of engagement with one another. Conversely, if the gears are too close together, there may be tendency to bind. Even if the gears of the two components are properly placed during initial installation, they may shift position over time thereby causing poor interaction.

SUMMARY OF THE INVENTION

The present invention provides advantages and alternatives over the prior art by providing a damper assembly incorporating a bushing adapted to rotate within a wall structure and engage a post on a bin or other element to be controlled. The bushing defines a hub of an integral, coaxial rotor that rides within a fluid containing housing. The bushing and rotor rotate concurrently about a common axis during rotation of the bin or other device being controlled. The drag on the rotor thereby slows the rotation of the engaged post and the associated bin or other structure being controlled.

In accordance with one exemplary aspect, the present invention provides a damper assembly adapted for mounting through a support wall for engagement with a pivot shaft of a pivoting structure. The damper assembly includes a rotor assembly including a rotor and a bushing member integral with the rotor. The bushing member extends outwardly away from a position on the rotor to a distal end remote from the rotor. The bushing member has an elongated tubular construction including an outer surface adapted to rotate within an opening in the support wall. The bushing member also includes an internal axial passageway. The internal axial passageway has an opening at the distal end and extends from the distal end at least partially along the length of the bushing member such that the internal axial passageway defines a female acceptance opening for mating engagement with the pivot shaft of the pivoting structure. A housing containing a damping liquid is disposed at least partially about the rotor. The rotor and bushing member are maintained in fixed relation to one another and are conjunctively rotatable relative to the housing about an axis defined by the axial passageway in the bushing member.

Other features and advantages of the invention will become apparent to those skilled in the art upon review of the following detailed description, claims and drawings in the various views.

Before the embodiments of the invention are explained in detail, it is to be understood that the invention is not limited in its application to the details of construction and the arrangements of components set forth in the following description or illustrated in the drawings. Rather, the invention is capable of other embodiments and of being practiced or of being carried out in various ways. Also, it is to be understood that the phraseology and terminology used herein are for purposes of description only and should not be regarded as limiting. Thus, the use of "including", "comprising", and variations thereof is meant to encompass the items listed and equivalents thereof, as well as additional items and equivalents.

DETAILED DESCRIPTION OF THE PREFERRED EMBODIMENTS

Figure 1:
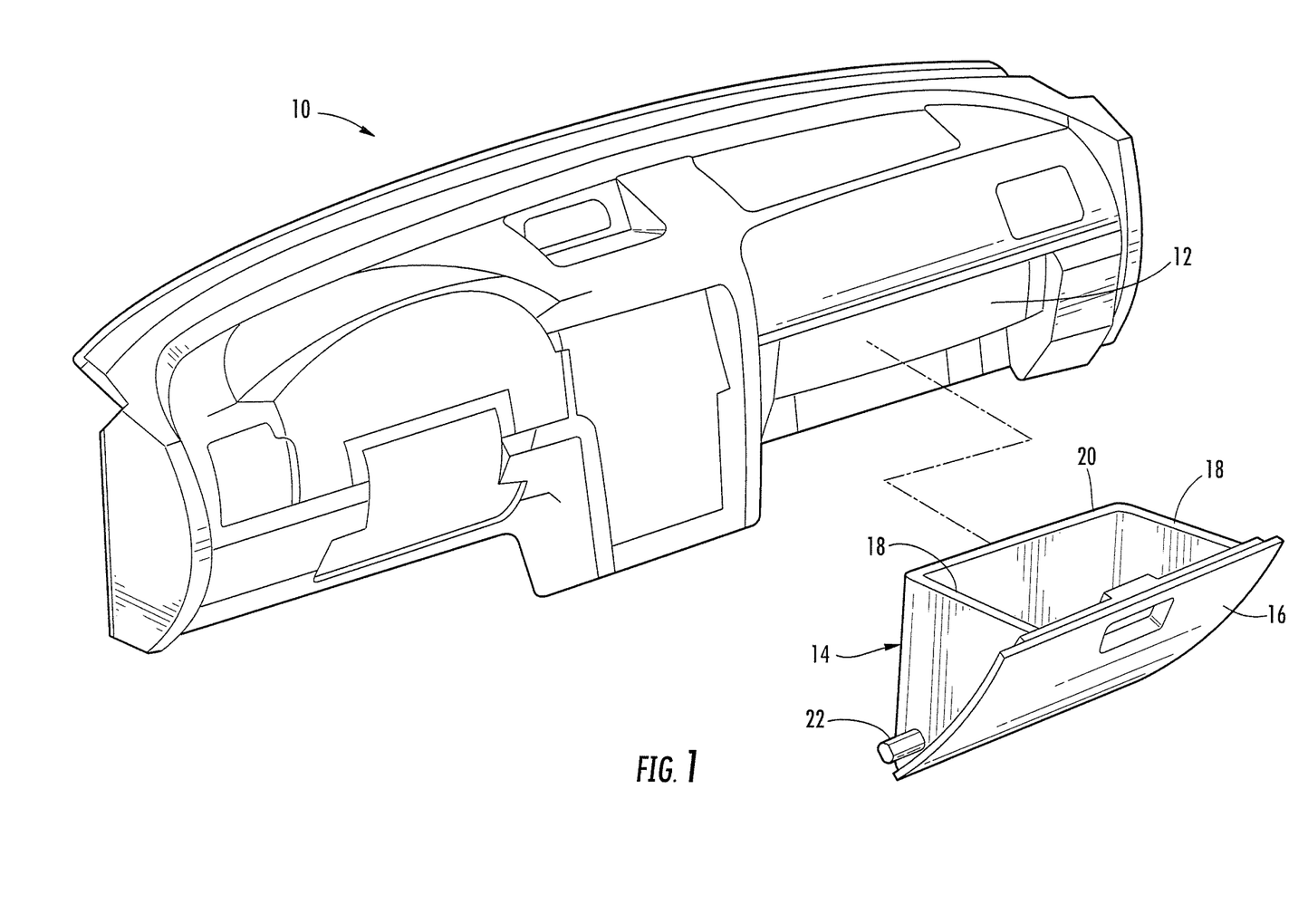
FIG. 1 is an exploded perspective view of an instrument panel and glove box for an automotive vehicle.

Reference will now be made to the drawings, wherein to the extent possible, like elements are designated by like reference numerals throughout the various views. FIG. 1 illustrates an exemplary instrument panel 10 as may be used in an automotive vehicle positioned at the front end of a passenger compartment. As shown, the instrument panel 10 includes an opening 12 disposed at a lower region of one side and projecting in the longitudinal direction of the vehicle. A glove box 14 is provided for insertion into the opening 12. In the illustrated exemplary arrangement, the glove box 14 includes a front panel 16 which is adapted to be in substantially flush relation with the surrounding surface of the instrument panel 10 when the glove box 14 is in a closed position. The glove box 14 further includes a pair of laterally spaced side panels 18 which are joined at their front edges to the front panel 16. A rear panel 20 is joined to the rear edges of the side panels 18 to define a bin interior adapted to hold various articles.

Figure 2:
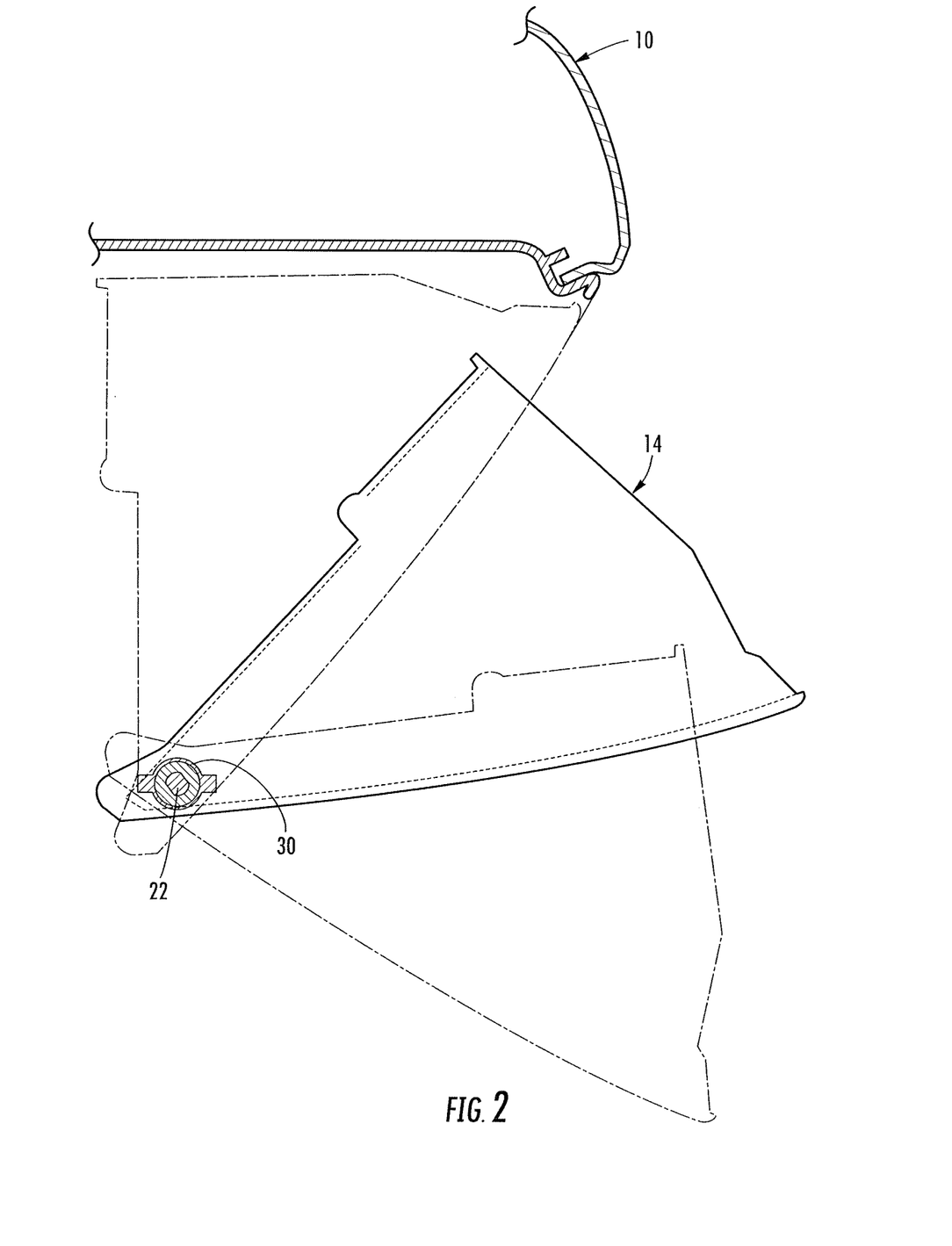
FIG. 2 is an enlarged vertical cross-sectional view of the instrument panel of FIG. 1 with the glove box illustrated moving between open and closed conditions.

As illustrated, pivot shafts 22 (only one shown) project outwardly away from the side panels 18 to define an axis of rotation for the glove box 14 as it is rotated between open and closed positions (FIG. 2). In accordance with the present invention, the pivot shafts 22 are received in mating relation within and operatively engage a damper assembly 30. As will be described further hereinafter, the damper assembly 30 acts to impede the rate of rotation of the pivot shaft during movement between open and closed positions thereby providing controlled movement of the glove box 14.

Importantly, it is to be understood that while the damper assembly 30 is illustrated and described in relation to the operation of a glove box 14, such a damper assembly 30 is in no way restricted to such use. Rather, it is contemplated that a damper assembly 30 as will be now described may be used in conjunction with any number of articles which pivot between various positions. By way of example only, and not limitation, such structures may include sunglass bins, cup holders, handles, arm rests, and the like. Moreover, damper assemblies within the scope of the present invention may likewise be utilized in non-automotive environments, including, by way of example only, furniture, appliances, electronic components, and the like as may be desired. In particular, the damper assemblies within the scope of the present invention may find particular application in association with relatively small pivoting structures such as bins for sunglasses and the like that are positioned at locations with limited surrounding space.

Figure 3:
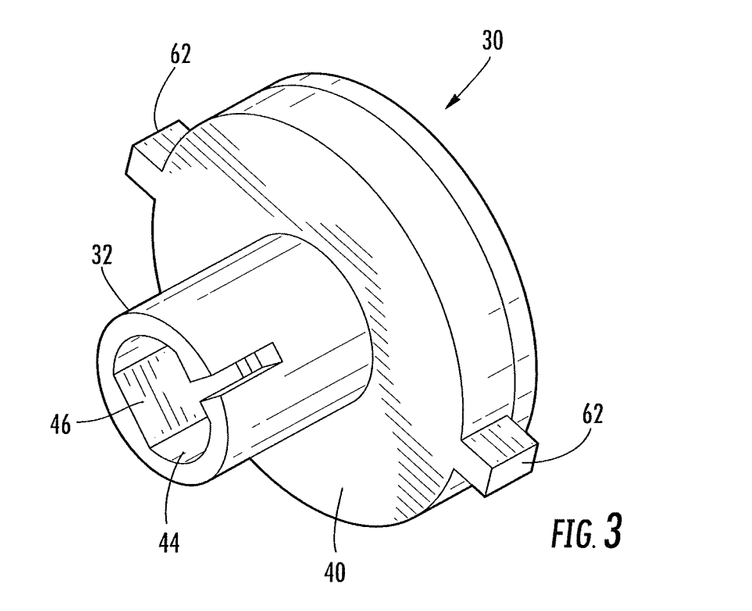
FIG. 3 is a first perspective view of an exemplary damper assembly incorporating an integral bushing in accordance with the present invention.
Figure 4:
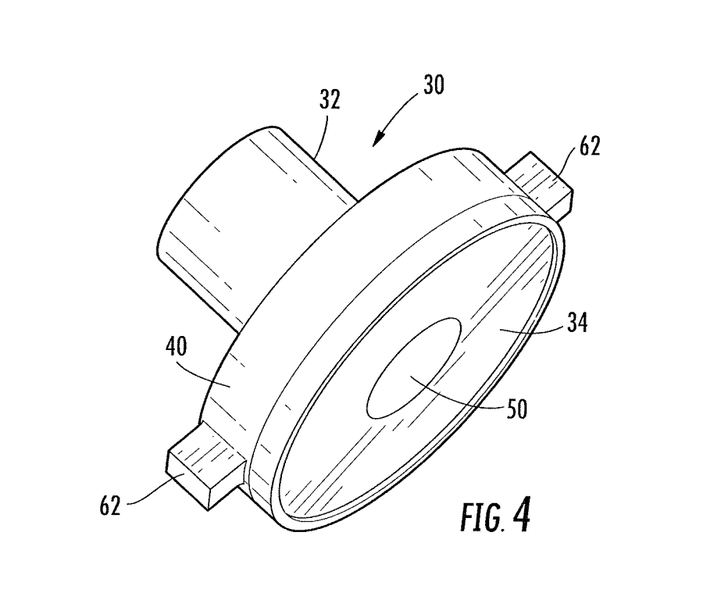
FIG. 4 is a second perspective view of the damper assembly of FIG. 3.
Figure 5:
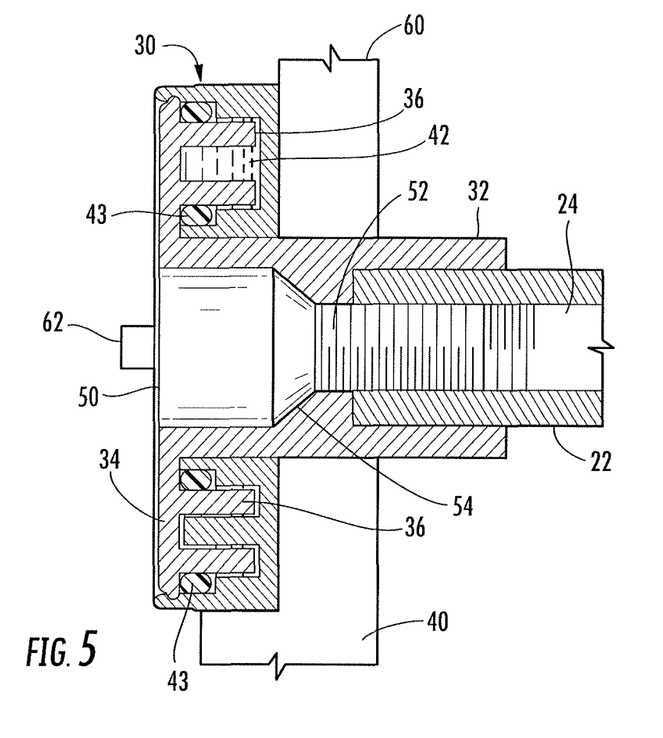
FIG. 5 is a cut-away view of the damper assembly of FIGS. 3 and 4 matedly engaging a post member of a bin or other rotating device to be controlled.

Referring now jointly to FIGS. 3, 4 and 5, one exemplary embodiment of a damper assembly 30 consistent with the present invention is shown. In the illustrated configuration, the damper assembly 30 includes a bushing member 32 which is integral with a rotor 34. The bushing member 32 and rotor 34 thus define a rotor assembly of unitary construction. As illustrated, the bushing member 32 defines a coaxial hub of the rotor 34. Thus, rotation of the bushing member 32 is translated to the rotor 34. As best illustrated in FIG. 5, in the illustrated arrangement the rotor 34 includes a plurality of vane elements 36 projecting outwardly away from a surface of the rotor 34 at positions radially outboard from the bushing member 32. A housing 40 extends in covering relation to the vane elements 36 such that the vane elements ride within channels in the housing 40. A liquid 42 is held within the channels in the housing 40 in surrounding relation to the vane elements 36. O-rings 43 or other sealing elements act to form a fluid-tight seal such that the liquid does not escape.

According to the potentially desirable practice, the bushing member 32 and the rotor 34 are formed as a one-piece molded article from a thermoplastic polymeric material using techniques such as injection molding or the like. Materials such as Polyoxymethylene (POM), Nylon 6, Nylon 6,6, polypropylene or the like may be particularly useful. However, other polymeric materials as well as non-polymeric materials including metals, ceramics or the like also may be used if desired. Likewise, the housing 40 may be formed as a one-piece or multi-piece molded article from a thermoplastic polymeric material using techniques such as injection molding or the like. Materials such as Polycarbonate, Nylon 6, Nylon 6,6, polypropylene or the like may be particularly useful. However, other polymeric materials as well as non-polymeric materials including metals, ceramics or the like also may be used if desired. In this regard, the housing 40 may be formed from either the same material as the bushing member 32 and rotor 34 or from a different material.

As will be appreciated, in the illustrated exemplary arrangement the bushing member 32 and integrally connected rotor 34 may be rotated relative to the housing 40. During such relative rotation, the vane elements 36 are caused to move through the liquid 42. The liquid 42 thus provides a drag against the relative rotational movement so as to require additional rotational force to achieve a desired degree of relative rotation.

As best seen through joint reference to FIGS. 3 and 5, in the illustrated exemplary construction the bushing member 32 has a circular exterior formed by walls which extend at least partially around an axial passageway 44. As best illustrated in FIG. 3, the axial passageway 44 has a non-circular inner surface profile including one or more planar surfaces 46. In this regard, the surface profile of the inner diameter of the bushing member 32 may be configured to substantially mate with the outer surface profile of the pivot shaft 22 such that the axial passageway 44 defines a key-way entry for matedly accepting the pivot shaft 22 therein. As will be understood, the use of such mating geometries acts to block relative rotation between the bushing member 32 and a pivot shaft 22 which is inserted therein (FIG. 5).

Figure 6:
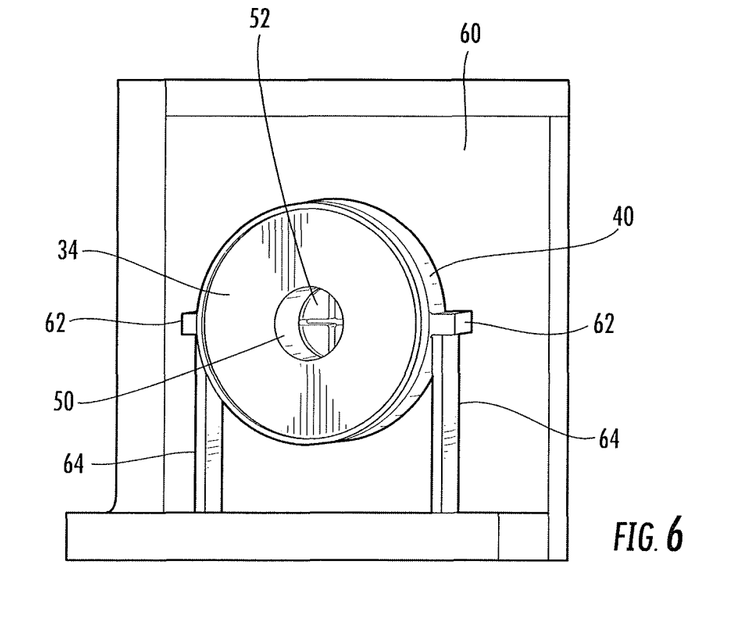
FIG. 6 is a rear view of the installation shown in FIG. 5.

As best illustrated through joint reference to FIGS. 4-6, in the illustrated exemplary configuration the damper assembly 30 includes a rear screw access opening 50 disposed in substantially axial alignment with the axial passageway 44. Moreover, there is pass-through communication between the axial passageway 44 and the screw access opening 50. Thus, a screw 52 or other fastening device may be inserted in sunken relation through the screw access opening 50 to a position at which the head of the screw or other fastening device is seated against an interior shoulder surface 54 (FIG. 5) and with the distal end of the screw 52 or other fastening device passing into engagement with the pivot shaft 22 held within the axial passageway 44. In this arrangement, the screw 52 or other fastening device will draw the pivot shaft 22 axially inwardly while also aiding in holding the pivot shaft 22 in place relative to the surrounding bushing member 32. Such a fastening arrangement may be particularly desirable in instances where there is not a close, keyed relationship between the exterior surface of the pivot shaft 22 and the interior surface of the bushing member 32.

Referring to FIGS. 5 and 6, in practice the damper assembly 30 may be arranged with the bushing member 32 projecting through a support wall 60 such as an interior wall surrounding the opening 12 in the instrument panel 10. Due to the substantially circular outer diameter of the bushing member 32, the bushing member 32 may rotate with relatively low friction relative to the support wall 60. In the illustrated exemplary arrangement, the housing 40 of the bushing member 32 includes outwardly projecting ears 62 which are oriented to engage blocking supports 64 at the exterior of the support wall 60. Alternatively, fasteners such as screws or the like (not shown) may be inserted through the ears and into the support wall 60. Thus, the housing 40 is held in a stationary position relative to the support wall 60 and rotation of the bushing member 32 and integral rotor 34 will not be translated to the housing 40.

During operation, as the glove box 14 or other structure being controlled is rotated, the pivot shaft 22 will rotate about its axis of rotation. With the pivot shaft 22 held within the bushing member 32, the rotation of the pivot shaft 22 is translated to the surrounding bushing member 32. Thus, the bushing member 32 rotates in conjunction with the pivot shaft 22 held at the interior about a common axis. As the bushing member 32 rotates, the integrally connected rotor 34 also rotates about the same axis. As the rotor 34 rotates, there is relative movement between the rotor 34 and the fluid-containing housing 40. During this relative movement, the vane elements 36 are forced to move through the liquid 42 which provides a degree of resistance against rotation. This resistance results in a drag on the rotation of the bushing member 32 and the pivot shaft 22 thereby slowing the rate of movement of the glove box 14 or other device being controlled. Thus, the propensity for the uncontrolled rapid movement of such a device is greatly reduced.

Figure 7:
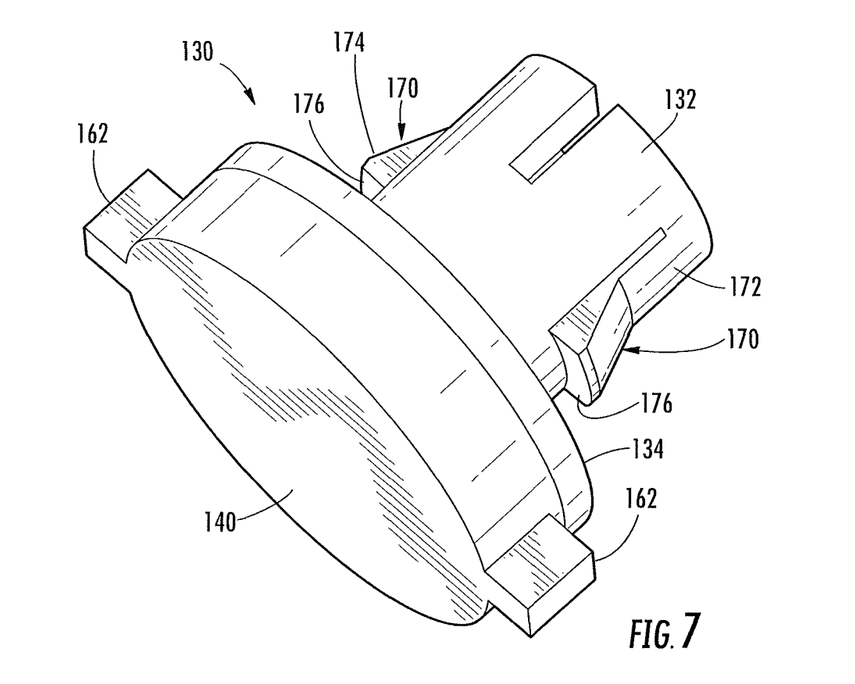
FIG. 7 is a perspective view of an alternative embodiment of an exemplary damper assembly incorporating an integral bushing in accordance with the present invention.
Figure 8:
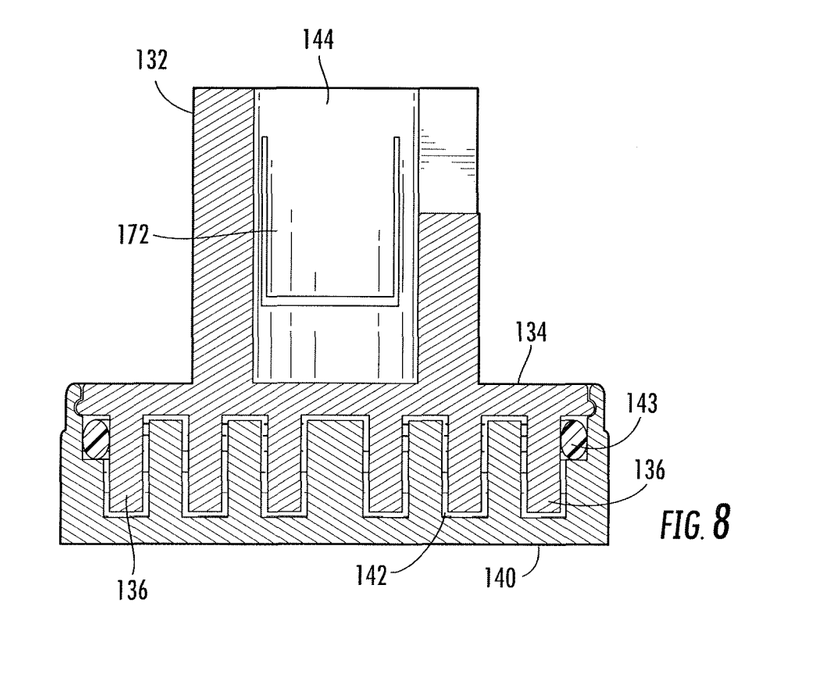
FIG. 8 is a cut-away view taken generally through the damper of FIG. 7.
Figure 9:
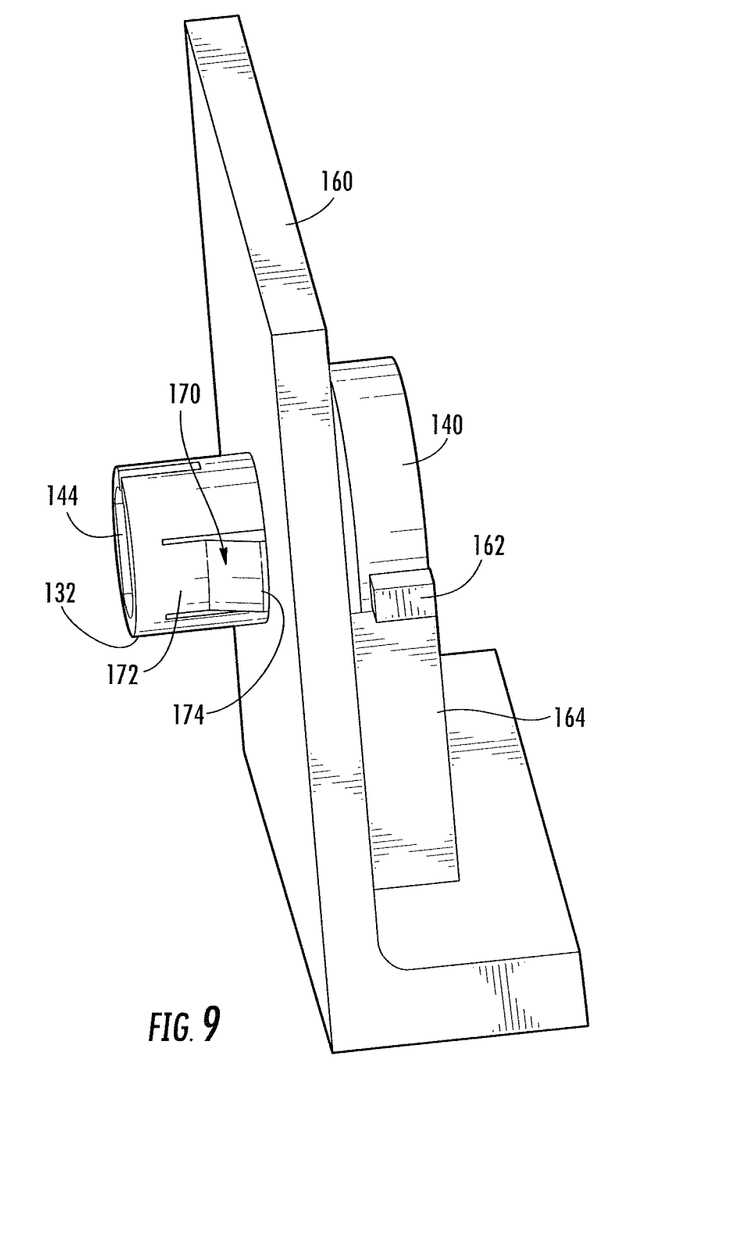
FIG. 9 is a view illustrating the damper assembly of FIG. 7 mounted at a support wall.

An alternative embodiment of the present invention is shown in FIGS. 7-9 wherein elements corresponding to those previously described are designated by like reference numerals increased by 100. In the illustrated exemplary embodiment, a damper assembly 130 is shown which includes a bushing member 132 and a rotor 134. As illustrated in FIG. 8 in this embodiment the rotor 134 includes vane elements 136 that project downwardly from a side facing away from the bushing member 132. A generally cup-like housing 140 is disposed about the rotor 134 and vane elements 136 with a fluid 142 contained therein. An O-ring 143 or other sealing element operates to form a fluid-tight seal between the rotor 134 and the housing 140. Thus, the bushing member 132 and integral rotor 34 may be rotated relative to the housing 140 without loss of the liquid 142.

As in the prior described embodiment, the bushing member 132 includes an elongated axial passageway 144 having a contoured inner surface adapted for keyed mating acceptance of a pivot shaft (not shown). As described previously, such a keyed mating relationship causes rotation of the pivot shaft to be translated to the bushing member 132 and integral rotor 134 thereby causing the rotor 134 to rotate about a common axis with the bushing member 132 and the pivot shaft held therein. During such rotation, the vane elements 136 are forced to pass through the contained liquid 142 thereby providing a degree of resistance against rotation.

In the exemplary embodiment of FIGS. 7-9, the damper assembly 130 includes a pair of snap-in detents 170 which are mounted on flexible leaf-spring cutouts 172 formed in the walls of the bushing member 132. As shown, the snap-in detents 170 have a ramped lateral face 174 extending in inwardly angled relation away from a proximal base 176. The proximal base 176 is spaced apart from the opposing upper face of the rotor 134. The bushing member 132 may be inserted through an opening in a support wall 160 causing the snap-in detents 170 to be pushed inwardly during the insertion process and to then snap outwardly into place with proximal bases 176 in overlying relation to the inner surface of the support wall 160. In this condition, the bushing member 132 is thus blocked against withdrawal through the support wall 160 and the support wall 160 is held between the snap-in detent 170 and the face of the rotor 134. Thus, the damper assembly 130 is held in place relative to the support wall 160. As in the prior embodiment, rotational movement of the housing 140 may be blocked by holding ears 162 in place relative to the support wall 160 and/or blocking supports 164 at the exterior of the support wall 160.

According to the potentially desirable practice, the bushing member 132 and the rotor 134 are formed as a one-piece molded article from a thermoplastic polymeric material using techniques such as injection molding or the like. Materials such as Polyoxymethylene (POM) Nylon 6, Nylon 6,6, polypropylene or the like may be particularly useful. However, other polymeric materials as well as non-polymeric materials including metals, ceramics or the like also may be used if desired. Likewise, the housing 140 may be formed as a one-piece or multi-piece molded article from a thermoplastic polymeric material using techniques such as injection molding or the like. Materials such as Polycarbonate, Nylon 6, Nylon 6,6, polypropylene or the like may be particularly useful. However, other polymeric materials as well as non-polymeric materials including metals, ceramics or the like also may be used if desired. In this regard, the housing 140 may be formed from either the same material as the bushing member 132 and rotor 134 or from a different material.

Figure 10:
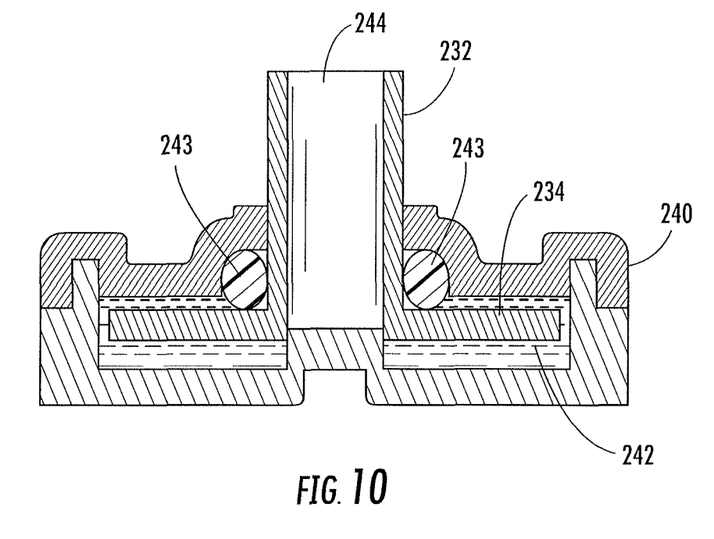
FIG. 10 is a cut-away view illustrating an alternative embodiment of an exemplary damper assembly incorporating an integral bushing in accordance with the present invention.

An alternative embodiment of the present invention is shown in FIG. 10 wherein elements corresponding to those previously described are designated by like reference numerals within a 200 series. In the illustrated exemplary embodiment, a damper assembly is shown which includes a bushing member 232 and a rotor 234. As illustrated in FIG. 10, in this embodiment the rotor 234 does not include vane elements projecting outwardly in raised relation. Rather, the rotor 234 may define a disk or fingers which extend outwardly in the radial direction from a center portion of the rotor. For example, the rotor may be a disk with the perimeter defining a vane element or may have a hub and spoke configuration with the spokes defining vane elements. An O-ring 243 or other sealing element operates to form a fluid-tight seal between the rotor 134 and the housing 240. Thus, the bushing member 232 and integral rotor 234 may be rotated relative to the housing 240 without loss of the liquid 242.

As in the prior described embodiments, the bushing member 232 includes an elongated axial passageway 244 having a contoured inner surface adapted for keyed mating acceptance of a pivot shaft (not shown). As described previously, such a keyed mating relationship causes rotation of the pivot shaft to be translated to the bushing member 232 and integral rotor 234 thereby causing the rotor 234 to rotate about a common axis with the bushing member 232 and the pivot shaft held therein. During such rotation, the portion of the rotor extending radially outwardly from the bushing member 232 is forced to pass through the contained liquid 242 thereby providing a degree of resistance against rotation.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

Various features of the invention are set forth in the following claims.

What is claimed is:

1. A damper assembly adapted for mounting through a support wall for engagement with a pivot shaft of a pivoting structure, the damper assembly comprising: a rotor assembly including a rotor and a bushing member integral with the rotor, the bushing member extending outwardly away from a position on the rotor to a distal end remote from the rotor, the bushing member having an elongated tubular construction including an outer surface adapted to rotate within an opening in the support wall, the bushing member also including an internal axial passageway, the internal axial passageway having an opening at the distal end and extending from the distal end at least partially along the length of the bushing member such that the internal axial passageway defines a female acceptance opening for mating engagement with the pivot shaft of the pivoting structure; and a housing containing a damping liquid disposed at least partially about the rotor, wherein the rotor and bushing member are maintained in fixed relation to one another and are conjunctively rotatable relative to the housing about a common axis defined by the axial passageway in the bushing member wherein the rotor comprises a platform having a first side and a second side with at least one vane element projecting away from at least one side of the platform at a position radially outboard from the bushing member and wherein the bushing member defines a central hub extending only from one side of the platform and wherein said housing extends in covering relation to said at least one vane element and defines at least one channel and said at least one vane element is disposed in said at least one channel, and said liquid within said housing is held in said at least one channel in surrounding relation to said at least one vane element and, on rotation of said rotor, said at least one vane element is caused to move through the liquid and said liquid thus provides a drag against relative rotational movement of said rotor assembly and wherein the axial passageway is axially aligned with a fastener acceptance opening in the rotor, and wherein an elongated fastener projects through the fastener acceptance opening and into the axial passageway for engagement with the pivot shaft, wherein the fastener is a screw seated against a reduced diameter shoulder at a position between the fastener acceptance opening and the axial passageway such that the pivot shaft and the fastener are in coaxial relation.

2. The damper assembly as recited in claim 1, wherein said platform includes a plurality of vane elements projecting axially away from only one side of said platform at positions radially outboard from said bushing member and said housing defines a plurality of channels with each said vane element disposed in a separate one of said channels.

3. The damper assembly as recited in claim 2, wherein the vane elements project outwardly from the first side of the platform in the same direction as the bushing member.

4. The damper assembly as recited in claim 1, wherein the housing includes outwardly projecting ear members for blocking rotation of the housing during rotation of the rotor assembly.

5. The damper assembly as recited in claim 1, wherein the axial passageway has a cross-sectional geometry including one or more planar surfaces adapted to block rotation of the pivot shaft within the axial passageway such that rotation of the pivot shaft is translated to the rotor assembly.

6. The damper assembly as recited in claim 5, wherein the cross-sectional geometry of the axial passageway matches the cross-sectional geometry of the pivot shaft, such that the pivot shaft is held in non-rotatable keyed relation within the axial passageway.

7. The damper assembly as recited in claim 1, wherein the pivoting structure is an automotive bin.

8. A damper assembly as claimed in claim 1 wherein said rotor assembly is a one piece rotor assembly of thermoplastic polymer.

9. A damper assembly as recited in claim 1 wherein said assembly includes an O-ring seal between said housing and said at least one vane element of said rotor.

10. A damper assembly as recited in claim 2 wherein said assembly includes two O-ring seals, each said O-ring seal disposed between said housing and a separate one of said vane elements.

* * * * *